United States Patent
Lutz et al.

(10) Patent No.: US 11,339,671 B2
(45) Date of Patent: May 24, 2022

(54) METHODS FOR MANUFACTURING POROUS BARRIER COATINGS USING AIR PLASMA SPRAY TECHNIQUES

(71) Applicant: HONEYWELL INTERNATIONAL INC., Morris Plains, NJ (US)

(72) Inventors: Bradley Lutz, Phoenix, AZ (US); David Jorgensen, Phoenix, AZ (US)

(73) Assignee: HONEYWELL INTERNATIONAL INC., Charlotte (NO)

( * ) Notice: Subject to any disclaimer, the term of this patent is extended or adjusted under 35 U.S.C. 154(b) by 148 days.

(21) Appl. No.: 16/723,110

(22) Filed: Dec. 20, 2019

(65) Prior Publication Data

US 2021/0189892 A1 Jun. 24, 2021

(51) Int. Cl.
| | |
|---|---|
| *F01D 5/28* | (2006.01) |
| *C23C 4/11* | (2016.01) |
| *C23C 4/134* | (2016.01) |
| *C23C 4/073* | (2016.01) |

(52) U.S. Cl.
CPC ............ F01D 5/288 (2013.01); C23C 4/11 (2016.01); C23C 4/134 (2016.01); C23C 4/073 (2016.01); *F05B 2230/90* (2013.01); *F05B 2280/20043* (2013.01); *F05B 2280/5002* (2013.01)

(58) Field of Classification Search
CPC . F01D 5/288; C23C 4/11; C23C 4/134; C23C 4/073; F05B 2230/90; F05B 2280/20043; F05B 2280/5002; F05D 2300/21
See application file for complete search history.

(56) References Cited

U.S. PATENT DOCUMENTS

| | | | |
|---|---|---|---|
| 4,507,394 A * | 3/1985 | Mase | .................. C04B 35/486 501/94 |
| 5,512,382 A | 4/1996 | Strangeman | |
| 6,001,426 A * | 12/1999 | Witherspoon | ......... C23C 4/131 427/449 |
| 6,057,047 A | 5/2000 | Maloney | |
| (Continued) | | | |

FOREIGN PATENT DOCUMENTS

| | | | |
|---|---|---|---|
| CN | 109628872 A * | 4/2019 | |
| CN | 109628872 A | 4/2019 | |
| (Continued) | | | |

OTHER PUBLICATIONS

Cho et al. "Low thermal conductivity of atomic layer deposition yttria-stabilized zirconia (YSZ) thin films for thermal insulation applications" (Apr. 2017) p. 1. (Year: 2017).*

(Continued)

*Primary Examiner* — Michael Lebentritt
*Assistant Examiner* — Brian Christopher Delrue
(74) *Attorney, Agent, or Firm* — Lorenz & Kopf, LLP (57) ABSTRACT

A method for forming a porous barrier coating on a substrate without substantial chemical segregation includes the steps of providing or obtaining a barrier coating material in powdered form and spraying the barrier coating material onto the substrate using air plasma spraying. The air plasma spraying is performed using an average homologous surface temperature of the depositing particles in a range of about 1.25 to about 1.5 and a particle velocity in a range of about 300 m/s to about 500 m/s. The depositing particles are fully molten.

18 Claims, 5 Drawing Sheets

(56) References Cited

U.S. PATENT DOCUMENTS

| | | | |
|---|---|---|---|
| 6,124,563 A * | 9/2000 | Witherspoon | C23C 4/12 |
| | | | 219/121.47 |
| 7,150,921 B2 | 12/2006 | Nelson et al. | |
| 7,563,503 B2 | 7/2009 | Gell et al. | |
| 8,084,086 B2 | 12/2011 | Hass et al. | |
| 8,187,717 B1 | 5/2012 | Xie et al. | |
| 8,334,079 B2 * | 12/2012 | Strutt | H01M 4/9066 |
| | | | 429/489 |
| 8,486,520 B2 | 7/2013 | Lima et al. | |
| 2002/0164432 A1 * | 11/2002 | Hofmeister | C04B 35/4508 |
| | | | 427/554 |
| 2003/0152814 A1 | 8/2003 | Gupta et al. | |
| 2008/0167173 A1 * | 7/2008 | Lima | C09D 1/00 |
| | | | 501/80 |
| 2009/0162670 A1 | 6/2009 | Lau et al. | |
| 2012/0301624 A1 | 11/2012 | Borchardt et al. | |
| 2015/0044444 A1 | 2/2015 | Gell et al. | |
| 2015/0191828 A1 * | 7/2015 | Tolpygo | C09D 1/00 |
| | | | 428/220 |
| 2015/0247245 A1 * | 9/2015 | Wali | C23C 28/321 |
| | | | 416/241 B |
| 2016/0289855 A1 * | 10/2016 | Task | F01D 25/005 |
| 2016/0333455 A1 | 11/2016 | Larose | |
| 2016/0348226 A1 | 12/2016 | Chen et al. | |
| 2017/0044901 A1 * | 2/2017 | Bacos | C23C 4/11 |
| 2017/0167373 A1 | 6/2017 | Hong et al. | |
| 2018/0133789 A1 | 5/2018 | Martin et al. | |
| 2019/0203603 A1 * | 7/2019 | Jorgensen | C23C 4/134 |
| 2020/0095666 A1 * | 3/2020 | Schmid | C23C 4/02 |
| 2020/0123071 A1 * | 4/2020 | Ndamka | C04B 41/87 |
| 2021/0017090 A1 * | 1/2021 | Shi | C04B 41/52 |

FOREIGN PATENT DOCUMENTS

| | | |
|---|---|---|
| EP | 3412791 A1 | 12/2018 |
| WO | 2006116844 A1 | 11/2006 |

OTHER PUBLICATIONS

Machine Translation—CN 109628872 (Year: 2019).*

Wang, Panpan, "Numerical Simulation of Plasma Spray-Physical Vapor Deposition," Aug. 21, 2017.

Jadhav, Amol D., et al., "Low-thermal-conductivity Plasma-Sprayed Thermal Barrier Coatings with Engineered Microstructures,"Science Direct, Mar. 13, 2006.

Guo, H.B., et al., "Atmospheric Plasma Sprayed Thick Thermal Barrier Coatings with High Segmentation Crack Density," Surface & Coatings Technology, 186 (2004) 353-363.

Dwivedi Gopal et al.: "Process-Property Relationship for Air Plasma-Sprayed Gadolinium Zirconate Coatings", Journal of Thermal Spray Technology, ASM International, Materials Park, US, vol. 24, No. 3, 2014, pp. 454-466, XP035433904.

* cited by examiner

METHODS FOR MANUFACTURING POROUS BARRIER COATINGS USING AIR PLASMA SPRAY TECHNIQUES

TECHNICAL FIELD

The present disclosure generally relates to barrier coatings, such as thermal barrier coatings or environmental barrier coatings, as may be employed in gas turbine engine technologies. More particularly, the present disclosure relates to methods for manufacturing porous barrier coatings using air plasma spray techniques.

BACKGROUND

Gas turbine engines, such as turbofan gas turbine engines, may be used to power various types of vehicles and systems, such as, for example, aircraft. During engine operation, generally, compressed air is mixed with fuel and burned, and the expanding hot combustion gases are directed against stationary turbine vanes in the engine. The vanes turn the high velocity gas flow partially sideways to impinge on turbine blades mounted on a rotationally mounted turbine disk or wheel.

The force of the impinging gas causes the turbine disk to spin at high speeds and to produce power. When the high-speed gas is passed out of the aft end of an aircraft turbine engine, forward thrust is created. Thus, the components of the engine are subjected to both high stress loadings and high heat (often in excess of 1100° C.). The high stress and heat can cause erosion, oxidation, corrosion, and thermal fatigue cracks in the components, resulting in unacceptably high rates of degradation.

To protect the components from the above, environment-resistant coatings and thermal barrier coatings may be used. Such coatings are typically applied to the turbine engine component using one of various powder spraying techniques, such as air plasma spraying. Many such coatings require that the application process therefor to the substrate fully melt the powder. Typically, however, using such processes, fully melting the powder results in a dense coating, whereas it may be desirable to have a porous coating to improve the physical properties of the coating with respect to its protective functions.

Prior art attempts to apply porous coatings for coating materials that are required to be fully melted upon application have typically employed the use of additive graphite or polyester blends, which are added to the spraying process, and then subsequently "burned-off," rendering porosity in the void spaces where the additive had previously been. However, using additive graphite or polyester blends undesirably adds costs not only in terms of the addition materials required, but also in the additional process steps required to burn-off the additives.

Hence, there is a need for improved barrier coating application methods for porous barrier coatings that are required to be fully melted upon application. It would be further desirable if such application methods could be accomplished using existing spray devices and apparatus. Furthermore, other desirable features and characteristics of the coating application methods disclosed herein will become apparent from the subsequent detailed description and the appended claims, taken in conjunction with the accompanying drawings and the preceding background.

BRIEF SUMMARY

This summary is provided to describe select concepts in a simplified form that are further described in the detailed description. This summary is not intended to identify key or essential features of the claimed subject matter, nor is it intended to be used as an aid in determining the scope of the claimed subject matter.

In one embodiment, a method for forming a porous barrier coating on a substrate without substantial chemical segregation includes the steps of providing or obtaining a barrier coating material in powdered form and spraying the barrier coating material onto the substrate using air plasma spraying. The air plasma spraying is performed using an average homologous surface temperature of the depositing particles in a range of about 1.25 to about 1.5 and a particle velocity in a range of about 300 m/s to about 500 m/s. The depositing particles are fully molten.

In another embodiment, a method for forming a porous low-k thermal barrier coating on a turbine engine substrate without substantial chemical segregation includes the steps of providing or obtaining a low-k thermal barrier coating material in powdered form and spraying the low-k thermal barrier coating material onto the turbine engine substrate using air plasma spraying. The low-k thermal barrier coating material includes a multi-component ceramic oxide with one or more rare-earth metals. Furthermore, the air plasma spraying is performed using an average homologous surface temperature of the depositing particles in a range of about 1.25 to about 1.5 and a particle velocity in a range of about 300 m/s to about 500 m/s. The depositing particles are fully molten.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Unless specifically stated or obvious from context, as used herein, the term "about" is understood as within a range of normal tolerance in the art, for example within 2 standard deviations of the mean. "About" can be understood as within 10%, 5%, 1%, or 0.5% of the stated value. Unless otherwise clear from the context, all numerical values provided herein are modified by the term "about."

Figure 1:
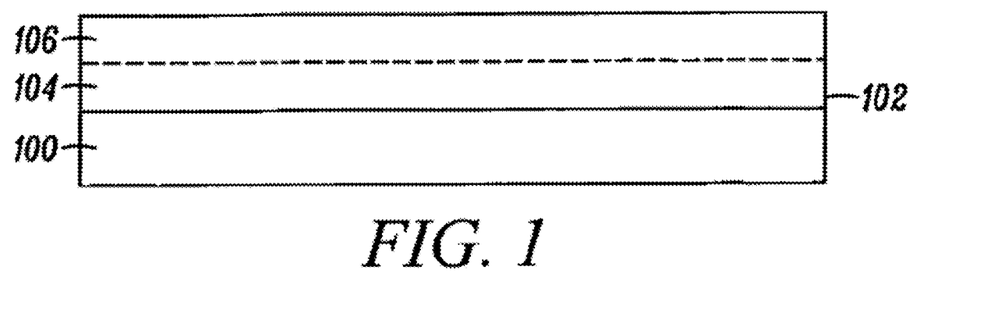
FIG. 1 is a cross-sectional view of a turbine engine component having various coating layers applied thereto, in accordance with the present disclosure.

FIG. 1 shows a cross section view of a portion of a substrate 100 that includes a coating system 102 formed thereon. The substrate 100 may be any one of numerous components that may be subjected to high temperatures and that may need a coating for protection therefrom. For example, the substrate 100 may be a gas turbine engine component, such as a hot-section turbine airfoil, such as a turbine vane or blade, or a combustion liner. The substrate 100 may include a superalloy or a ceramic matrix composite material, for example.

The coating system 102 includes an overlay coating (or a combination of overlay coatings) 104 and a thermal barrier coating 106. The overlay coating 104 is preferably made of a material that protects the substrate 100 from the environment attack. Additionally, the overlay coating 104 acts as a bond coat onto which the thermal barrier coating 106 is deposited. Suitable materials of which the overlay coating 104 may include, but are not limited to MCrAlY and MCrAlYX, M being Ni, Co, Fe or combinations of Ni, Co and Fe, and X being additive elements such as Hf, Si, Zr, Re, Pt and others individually or in combination thereof. In alternative embodiments, the overlay coating 104 may be a combination of overlay coatings, such as a two-layer bond coat, a two-layer bond coat plus a thin, porous thermal barrier coating (of a different chemistry than coating 106) layer, a two-layer bond coat plus a thermal barrier coating dense vertically segmented (DVS) layer, a one-layer bond coat plus a thermal barrier coating porous layer, or a one-layer bond coat plus a thermal barrier coating DVS layer, for example.

As alluded to above, the thermal barrier coating 106 is formed over the overlay coating (or combination) 104 and is bonded thereto. The thermal barrier coating (TBC) 106 provides heat resistance even when the substrate 100 is exposed to extremely high temperature, such as, above 1100° C. The TBC 106 may be any one of numerous suitable materials, often referred to as "low-k" materials in reference to their physical characteristic of having a relatively low thermal conductivity—for example, about 2.0 W/mK or less, or of about 1.5 W/mK or less, or of about 0.1 W/mK to 2.0 W/mK, or of about 0.1 W/mK to 1.5 W/mK. A characteristic of the TBCs 106 in accordance with the present disclosure is that they are multi-component ceramic oxides, often including rare-earth elements, that are susceptible to a wide range of melting temperatures, and as such are prone to chemical segregation as-applied if not fully melted upon impact with the substrate 100. Moreover, it is desirable that the TBC 106 be porous and not unnecessarily dense, so as to exhibit thermal barrier properties sufficient to withstand the operating temperatures of the turbine engine.

By way of an illustrative example of such a TBC, which should not be understood as limiting in any sense, a suitable TBC 106 in accordance with the present disclosure includes a tantala-zirconia mixture that is stabilized with two or more rare-earth stabilizers, elementally defined, by mole percent: about 8% to about 30% $YO_{1.5}$; about 8% to about 30% $YbO_{1.5}$ or $GdO_{1.5}$ or combination thereof; about 8% to about 30% $TaO_{2.5}$; about 0% to about 10% $HfO_2$; and a balance of $ZrO_2$. This TBC is characterized in that a multi-phase material including a tetragonal zirconia phase and at least one additional phase from the group of: a tantalate phase, a cubic zirconia phase, and an orthorhombic phase. The tetragonal zirconia phase and at least one additional phase are non-reactive with one another and remain as separate phases in the thermal barrier coating composition.

As initially noted, the TBC 106 may be applied using air plasma spraying (APS) techniques. Embodiments of the present disclosure provide for air plasma spraying of TBCs as described above such that the TBCs may be fully-melted upon application to minimize chemical segregation, yet while still including a porosity for improved thermal characteristics. In these APS techniques, an electric arc is typically used to heat various gasses, such as argon (as primary gas) and hydrogen (as secondary gas), to temperatures of about 8000° C., or higher (other primary/secondary gasses may be employed in other embodiments). The gasses are expelled from an annulus at high velocity, creating a characteristic thermal plume. The powder ceramic coating material (i.e., the low-k TBC as described above) is fed into the plume, and the melted particles are accelerated toward the substrate being coated.

Embodiments of the present disclosure are designed so as to be operable using conventional APS devices and apparatus. For example, a suitable plasma spray system includes a plasma gun anode which has a nozzle pointed in the direction of the deposit-surface of the substrate being coated, for example a component of a turbine blade. The plasma gun is often controlled automatically by a robotic mechanism, which is capable of moving the gun in various patterns across the substrate surface. The plasma plume extends in an axial direction between the exit of the plasma gun anode and the substrate surface.

Some type of powder injection means is disposed at a predetermined, desired axial location between the anode and the substrate surface. In some cases, the powder injection means is spaced apart in a radial sense from the plasma plume region, and an injector tube for the powder material is situated in a position so that it can direct the powder into the plasma plume at a desired angle. The powder particles, entrained in carrier gasses, are propelled through the injector and into the plasma plume. The particles are then heated in the plasma and propelled toward the substrate. The particles fully melt, impact on the substrate, and quickly cool to form the thermal barrier coating.

The porous TBC of the present disclosure, having minimal chemical segregation, is enabled by selection of a number of parameters that are associated with the deposition of a TBC coating from an APS system. In particular, APS parameters relevant to the present disclosure are velocity and temperature. These APS process parameters are discussed in greater detail as follows.

The particle velocity for the ceramic coating particles in this process is at least about 300 meters per second. In some specific embodiments, the velocity is at least about 400 m/s, and often, in the range of about 300 m/s to about 500 m/s or about 325 m/s to about 475 m/s. In other embodiments, the velocity of the particles may be from about 300 m/s to about 350 m/s, from about 350 m/s to about 400 m/s, from about 400 m/s to about 450 m/s, or about 450 m/s to about 500 m/s, or any sub-combination of these ranges. Various techniques are available for measuring particle velocity downstream from the plasma gun exit, using a variety of sensor systems.

As noted above, the temperature of the coating particles within the plasma is also a consideration for the present disclosure. In general, the temperature of the coating particles during air plasma-spraying is provided in accordance with an "average homologous surface temperature of the depositing particles," which is defined as the impact temperature of the particles at the substrate/the liquidus of the material. In some embodiments, the average homologous surface temperature of the depositing particles in accordance with the present disclosure is at least about 1.25, such as at least about 1.3, for example at least about 1.4, or at least about 1.5. In general, the average homologous surface temperature of the depositing particles may be in a range of from about 1.25 to about 1.5 or about 1.3 to about 1.45, such as from about 1.25 to about 1.3, from about 1.3 to about 1.4, or about 1.4 to about 1.5, or any sub-combination of these ranges. Those skilled in the art are familiar with adjustments in the APS systems (such as power levels and secondary gas flow) which will serve to heat the coating particles to the desired temperature. These temperatures, as defined above, are sufficient to fully melt the particles, as required to minimize chemical segregation. To accomplish these temperatures, in a typical embodiment, the torch current may be in the range of about 400 amps to about 540 amps.

Without being bound by theory, it is believed that the combination of the aforementioned APS process parameters allows the particles to be fully melted while still resulting in a porous as-applied TBC. For example, it is believed that when APS is performed in the foregoing manner, the fully molten powder hits the substrate at a high enough velocity that it "splashes-back" on impact. The continuous splash-back of the molten powder particles, along with continuous incoming molten particles, is believed to produce the porous coating.

Those of ordinary skill in the plasma spray coating art are familiar with other details which are relevant to applying coatings by APS techniques. Examples of the other steps and process parameters include: Cleaning of the surface prior to deposition; grit blasting to remove oxides; substrate temperature; plasma spray parameters such as spray distances (gun-to-substrate); selection of the number of spray-passes, powder feed rate, powder particle size, torch power; angle-of-deposition, post-treatment of the applied coating; primary/secondary gas flow rates; and the like. For example, without being limited, in a typical situation, the powder particle size varies in the range of about 10 microns to about 150 microns. Further as an example, in a typical situation, the flow rate of the (primary) Ar gas may be in a range of about 40 to about 150 normal-liters/min., and the flow rate of the (secondary) H2 gas may be in a range of about 4 to about 20 normal-liters/min.

Illustrative Examples

The present disclosure is now illustrated by the following non-limiting examples. It should be noted that various changes and modifications can be applied to the following examples and processes without departing from the scope of this invention, which is defined in the appended claims. Therefore, it should be noted that the following examples should be interpreted as illustrative only and not limiting in any sense.

Several APS trial runs were conducted using a TBC powder of the molar composition of oxides: about 8% to about 30% $YO_{1.5}$; about 8% to about 30% $YbO_{1.5}$ or $GdO_{1.5}$ or combination thereof; about 8% to about 30% $TaO_{2.5}$; about 0% to about 10% $HfO_2$; and a balance of $ZrO_2$. Used for each run was a SinplexPro™ APS gun, wherein the powder feed rate was about 25-to about 45 grams/min. Each run was performed at distances of 4, 4.5, and 5 inches. Furthermore, each run was performed twice for repeatability. For each run, the parameters of temperature and velocity were measured using conventional means, as described above.

Figure 2A:
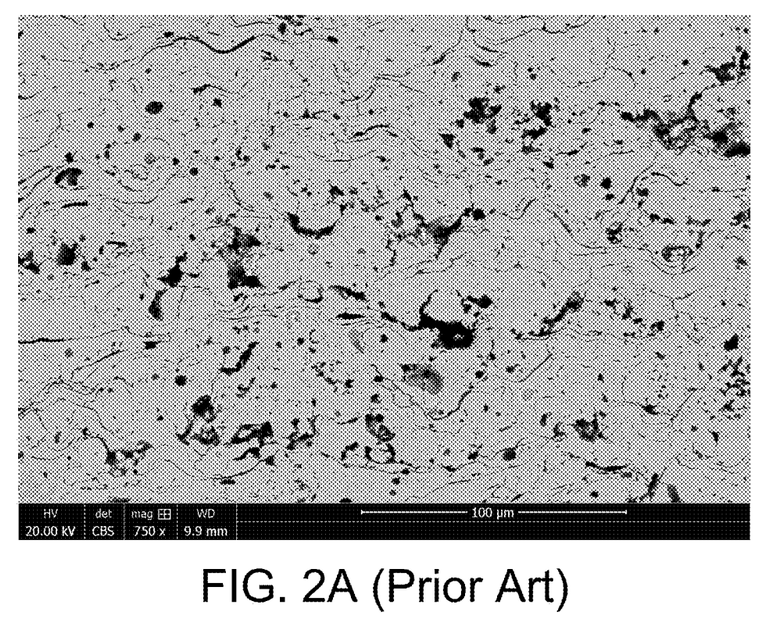
FIGS. 2A and 2B are SEM cross-sectional views of a thermal barrier coating applied using prior art air plasma spray techniques.
Figure 2B:
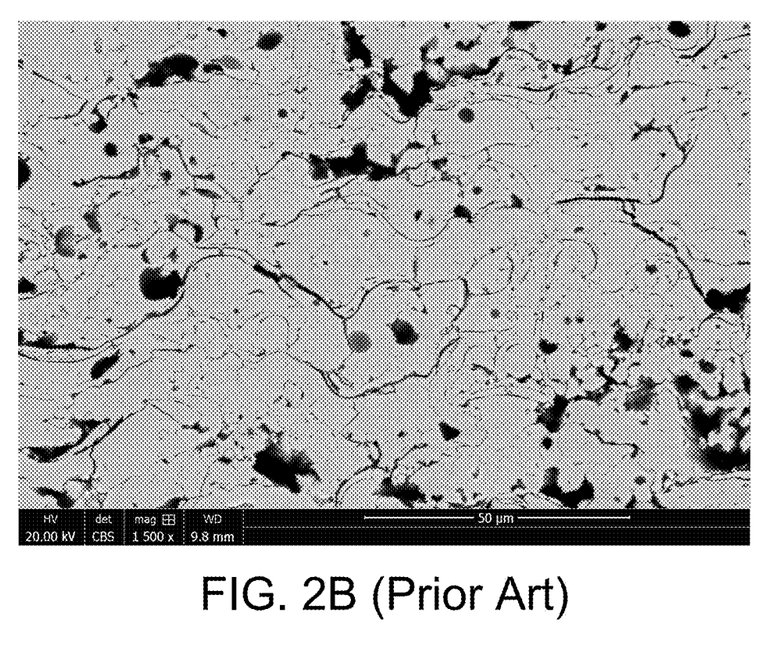
Figure 3A:
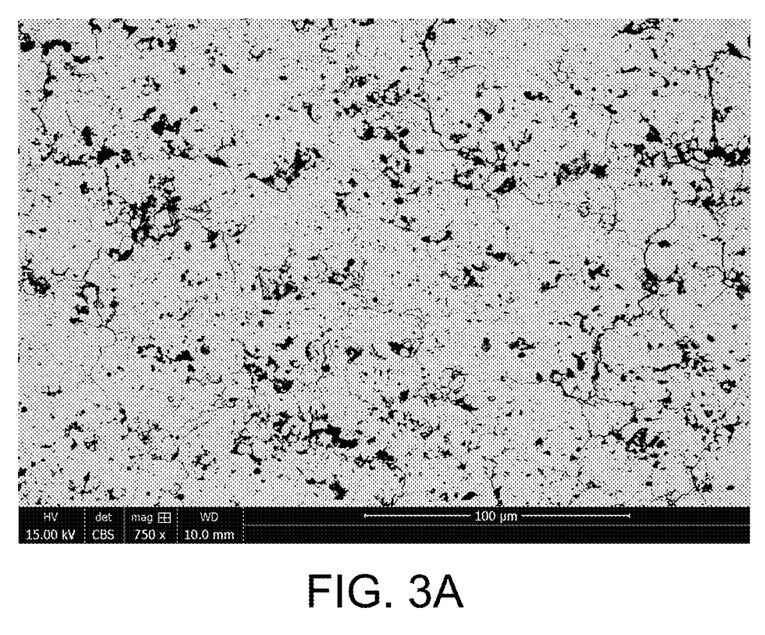
FIGS. 3A and 3B are SEM cross-sectional views of a thermal barrier coating applied using air plasma spray techniques in accordance with the present disclosure.
Figure 3B:
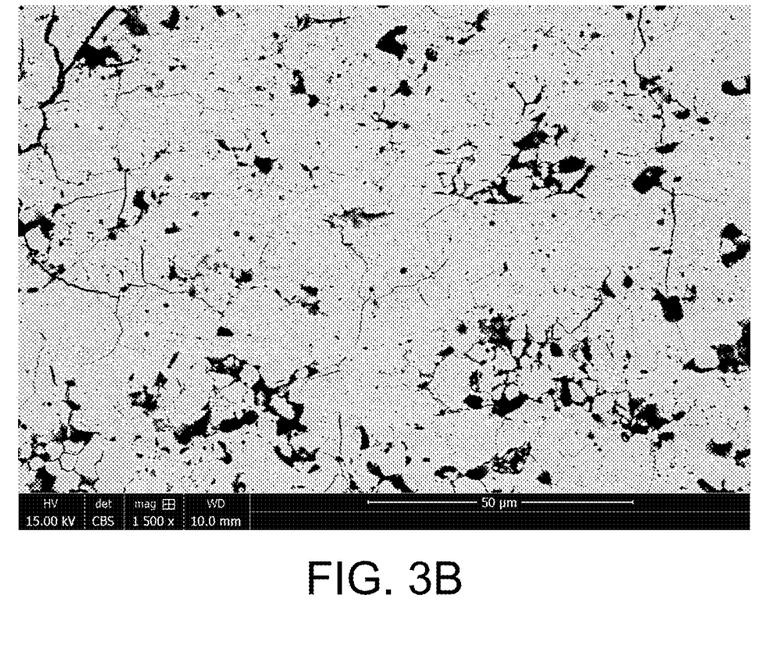
Figure 4A:
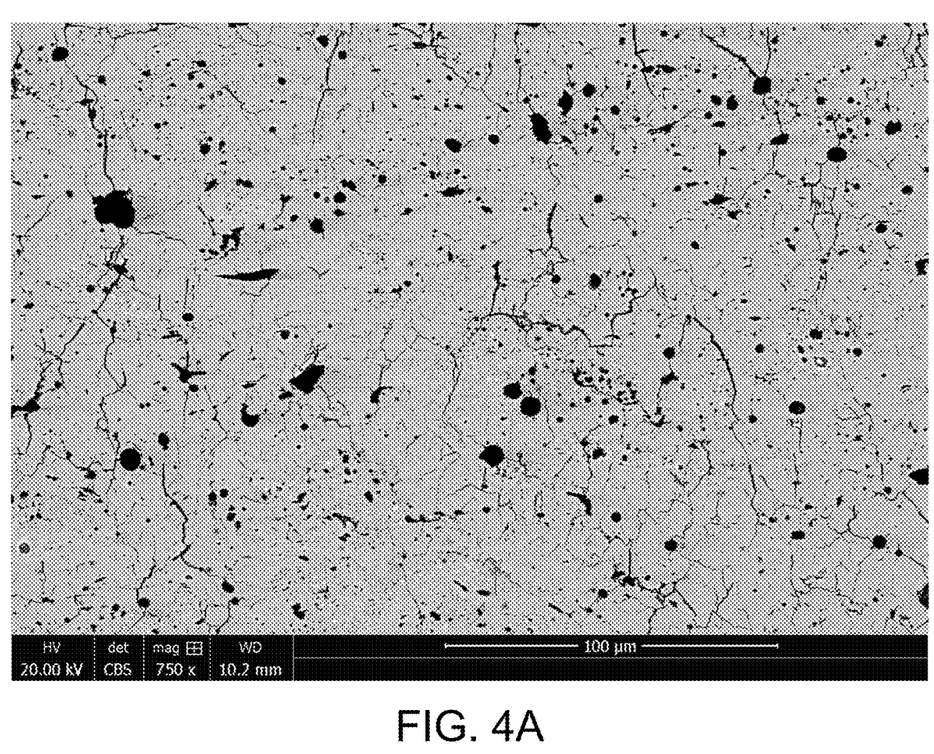
FIGS. 4A and 4B are SEM cross-sectional views of a thermal barrier coating that exhibits "substantial chemical segregation."
Figure 4B:
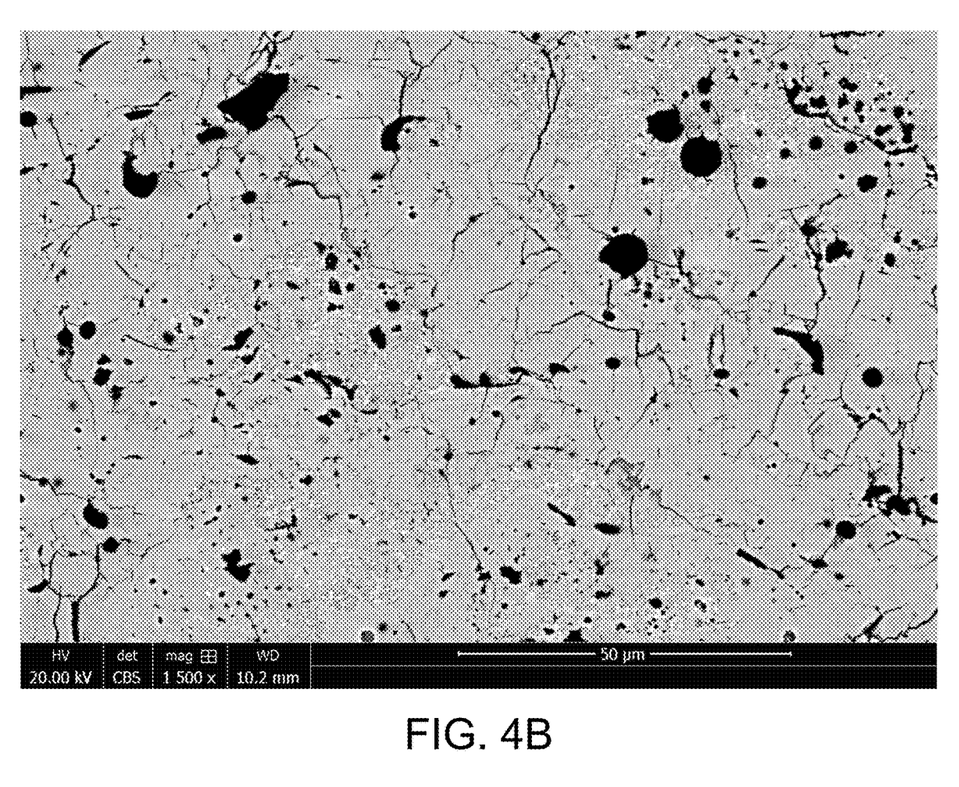

Based on the foregoing testing, the following parameters were determined to be suitable for achieving a porous TBC having minimal chemical separation: average homologous surface temperature of the depositing particles in a range of about 1.25 to about 1.5 and particle velocity in a range of about 300 m/s to about 500 m/s. For comparative purposes, FIGS. 2A and 2B are provided, which are SEM cross-sections of a TBC applied using conventional APS techniques. As can be seen in FIG. 2A, there is a relatively coarse porosity distribution, and as can be seen in FIG. 2B, there are defined inter-lamellar boundaries. The deposition resulting in FIGS. 2A and 2B is performed differently as compared to the present disclosure; in particular: this prior art APS technique does not require the materials to be fully molten—the technique is to build in pores by depositing a fraction of powder particles that are unmolten. In contrast, when APS is performed in accordance with embodiments of the present disclosure, using the parameters noted above, a relatively fine porosity distribution was observed (FIG. 3A), along with the substantial absence of inter-lamellar boundaries (FIG. 3B). In particular, within the ranges described above, porosity was increased to between about 10% and about 15%, with minimal chemical segregation observed. The as-deposited particles are, in contrast, fully molten. Accordingly, the inventive methods described herein provides for forming a porous barrier coating on a substrate without substantial chemical segregation—wherein "substantial chemical segregation" is understood to mean "a coating containing at least 20 volume percent of localized regions exhibiting segregation consisting of a matrix enriched with at least one solute relative to the average chemistry of the coating and precipitates that are depleted of at least one solute relative to the average chemistry of the coating." FIGS. 4A and 4B provide SEM cross-sections illustrating what "substantial chemical segregation" can look like, and contrast with the results achieved according to the inventive methods described herein.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

What is claimed is:

1. A method for forming a porous barrier coating on a substrate without substantial chemical segregation, the method comprising the steps of:
   providing or obtaining a barrier coating material in powdered form; and spraying the barrier coating material onto the substrate using air plasma spraying to form the porous barrier coating,
   wherein the air plasma spraying is performed using an average homologous surface temperature of the depositing particles in a range of about 1.25 to about 1.5 and a particle velocity in a range of about 300 m/s to about 500 m/s,
   wherein the depositing particles are fully molten, and
   wherein the porous barrier coating has a porosity of from about 10 to about 15%.

2. The method of claim 1, wherein the substrate is a turbine engine component.

3. The method of claim 2, wherein the substrate has been coated with an overlay coating or a combination of overlay coatings.

4. The method of claim 1, wherein the barrier coating material is a thermal barrier coating material.

5. The method of claim 4, wherein the thermal barrier coating material is a low-k thermal barrier coating material comprising a multi-component ceramic oxide with one or more rare-earth metals.

6. The method of claim 5, wherein the thermal barrier coating material is elementally defined, by mole percent: about 8% to about 30% $YO_{1.5}$; about 8% to about 30% $YbO_{1.5}$ or $GdO_{1.5}$ or combination thereof; about 8% to about 30% $TaO_{2.5}$; about 0% to about 10% $HfO_2$; and a balance of $ZrO_2$.

7. The method of claim 1, wherein the average homologous surface temperature of the depositing particles is in a range of about 1.3 to about 1.45.

8. The method of claim 1, wherein the porous barrier coating material is elementally defined, by mole percent: from about 8% to about 30% $YO_{1.5}$; from about 8% to about 30% $YbO_{1.5}$ or $GdO_{1.5}$ or combination thereof; from about 8% to about 30% $TaO_{2.5}$; from 0% to about 10% $HfO_2$; and a balance of $ZrO_2$.

9. The method of claim 8, wherein the particle velocity is in a range of about 325 m/s to about 475 m/s.

10. The method of claim 1, wherein the particle velocity is in a range of about 325 m/s to about 475 m/s.

11. The method of claim 1, wherein the particle velocity is in a range of about 300 m/s to about 350 m/s.

12. The method of claim 1, wherein the particle velocity is in a range of about 350 m/s to about 400 m/s.

13. The method of claim 1, utilizing as a secondary gas, hydrogen ($H_2$).

14. The method of claim 13, wherein the $H_2$ gas has a flow rate of about 4 to about 20 normal liters/min.

15. A method for forming a porous low-k thermal barrier coating on a turbine engine substrate without substantial chemical segregation, the method comprising the steps of:
   providing or obtaining a low-k thermal barrier coating material in powdered form, wherein the low-k thermal barrier coating material comprises a multi-component ceramic oxide with one or more rare-earth metals; and
   spraying the low-k thermal barrier coating material onto the turbine engine substrate using air plasma spraying to form the porous low-k thermal barrier coating,
   wherein the air plasma spraying is performed using an average homologous surface temperature of the depositing particles in a range of about 1.25 to about 1.5 and a particle velocity in a range of about 300 m/s to about 500 m/s, and
   wherein the depositing particles are fully molten, and
   wherein the porous low-k thermal barrier coating has a porosity of from about 10 to about 15%.

16. The method of claim 15, wherein the average homologous surface temperature of the depositing particles is in a range of about 1.3 to about 1.45.

17. The method of claim 15, wherein the porous low-k thermal barrier coating material is elementally defined, by mole percent: from about 8% to about 30% $YO_{1.5}$; from about 8% to about 30% $YbO_{1.5}$ or $GdO_{1.5}$ or combination thereof; from about 8% to about 30% $TaO_{2.5}$; from 0% to about 10% $HfO_2$; and a balance of $ZrO_2$.

18. The method of claim 15, wherein the particle velocity is in a range of about 325 m/s to about 475 m/s.

* * * * *